May 2, 1961 M. J. PURETIC 2,982,109

METHOD AND APPARATUS FOR SHIPBOARD STORAGE AND REFRIGERATION OF FRESHLY CAUGHT FISH

Original Filed Dec. 16, 1957 2 Sheets-Sheet 1

MARIO J. PURETIC,
INVENTOR.

BY William C. Babcock
ATTORNEY.

FIG. 2.
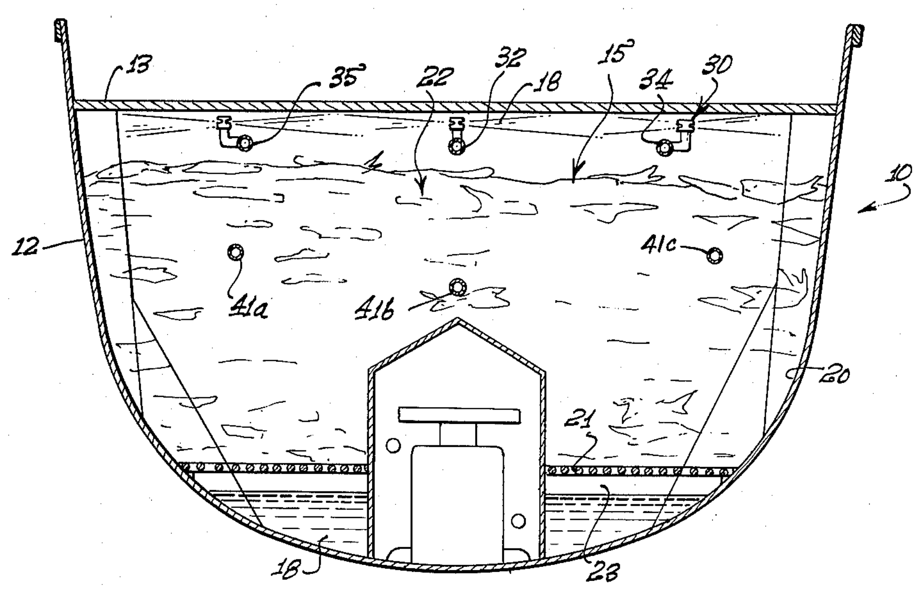
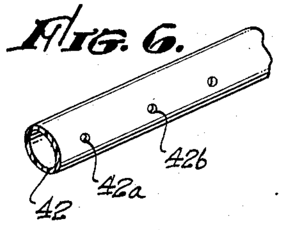
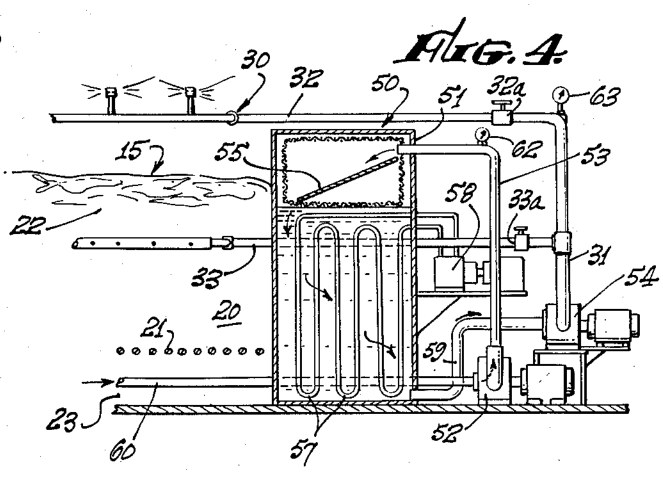
FIG. 7.
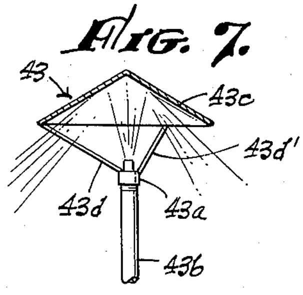
MARIO J. PURETIC,
INVENTOR.
BY William C. Babcock
ATTORNEY.

2,982,109

METHOD AND APPARATUS FOR SHIPBOARD STORAGE AND REFRIGERATION OF FRESHLY CAUGHT FISH

Mario J. Puretic, 30514 Avenida Corana, San Pedro, Calif.

Continuation of application Ser. No. 702,868, Dec. 16, 1957. This application May 12, 1960, Ser. No. 28,805

7 Claims. (Cl. 62—64)

This is a continuation of my co-pending patent application, Serial No. 702,868 filed December 16, 1957, and now abandoned.

The present invention relates generally to the field of commercial fishing, and more specifically to a novel method and apparatus for storing and refrigerating freshly caught fish on board ship.

Heretofore there have been two generally accepted methods used for storing and refrigerating fish aboard a commercial fishing boat. According to one method the fish are stacked in storage bins with layers of chopped ice interspersed between the layers of fish. After a period of storage it may be necessary to replenish the ice in order to maintain refrigeration of the fish.

The other method which has been commonly used is that of immersing the fish in cold brine. According to this method the fish are stored in a tank filled with brine, and the temperature of the brine is kept down to the desired level by contact with the cooling pipes of a refrigerating system.

The useful cargo space heretofore available for carrying fish has been seriously limited as a direct result of the antiquated methods of storing and refrigerating the fish. That is to say, the methods heretofore used have wasted much of the cargo space which could have been available for fish storage. Also, the time requirements have been excessive, in preparing the fishing boat before it leaves its home base, in loading the fish onto the boat as they are caught, and in unloading the catch when the boat returns to port.

The methods heretofore used have also made excessive demands upon the crew members who have performed the work of loading the fish. Experienced men are required for handling fish packing operations in the freezer holds where chopped ice is used for refrigeration. Handling the chopped ice and heavy fish in temperatures of about zero degrees Fahrenheit involves hard labor, and when the worker returns to the boat deck where the air temperature may be from 80° to 100° Fahrenheit, and where he may also be exposed to the sun, a serious health hazard is presented. In fact, the occurrence of heart attacks, sometimes fatal, is a commonplace result of working under these conditions.

Excessive spoilage of the fish, as well as physical damage incurred in the handling process, have also resulted from the methods heretofore used. In the ice-pack method of storage the excellent insulating properties of the ice preclude an even temperature distribution and make it possible for the fish to become too warm, at least in certain portions of the fish hold, despite the fact that a large quantity of ice is still present in the fish hold. In other words, with the ice-pack method the temperature is not equalized well enough to insure good refrigeration. Furthermore, with the ice-pack method there is always the danger of running out of ice, with resultant spoilage of the fish, which often makes it necessary for the boat to return to port with only a partial cargo of fish. Also, physical damage to the fish is caused during the packing of the load, and to an even greater extent during the unloading process since it is conventional practice to use ice picks to loosen the pack and it often happens that the picks unavoidably damage an appreciable quantity of fish.

The cold brine method of storage is very expensive since the refrigeration system must be coupled by means of an extensive array of cooling pipes directly to each tank of cold brine. In other words, the refrigeration system has a direct coupling of the entire load of fish. Furthermore, the tanksful of cold brine constitute a very heavy load which is a menace to navigation and greatly limits the speed at which the fishing boat can return to port with the catch. An additional disadvantage of the cold brine method of storage is the excessive salt penetration from the brine into the fish, which has a deleterious effect on its quality.

An object of the present invention, therefore, is to provide an improved method for storing and refrigerating freshly caught fish aboard a commercial fishing boat.

Another object of the invention is to provide an improved method of storing and refrigerating fish which makes full utilization of the cargo space of the fishing boat, saves time and labor, and minimizes spoilage as well as physical damage to the fish.

A further object of the invention is to provide novel apparatus for storing and cooling freshly caught fish on a commercial fishing boat.

According to the present invention a fish hold is utilized which includes a substantially horizontal grill structure dividing the hold into upper and lower portions. Freshly caught fish are stacked upon the grill structure within the upper portion of the hold, and a liquid coolant such as cold brine is sprayed upon the fish from a number of separate spraying positions near the top of the hold. As the liquid coolant drips through the fish stack into the lower portion of the fish hold, it is pumped out of the hold, circulated through a nearby refrigerating system, and returned to the spraying positions, in a continuous operating cycle.

Additional objects of the invention, therefore, are to provide a method of storing freshly caught fish such that they may be conveniently sprayed with a liquid coolant without the necessity of complete immersion in a liquid bath; to provide a liquid spray method of cooling freshly caught fish; and to provide a method and apparatus for maintaining refrigeration of a cargo of fish after the storage and initial cooling thereof.

The above and other objects of the invention will be more readily understood from the following description in conjunction with the accompanying drawing, in which:

Figure 2 is a cross-sectional view of the fish hold of the boat of Figure 1 showing how a cargo of fish is stored therein;

Figure 4 illustrates the refrigerating system of Figure 1, together with suitable apparatus for recirculating and cooling the liquid coolant;

Figure 6 illustrates a section of seeper hose; and

Figure 7 illustrates another form of spray nozzle.

Figure 1:
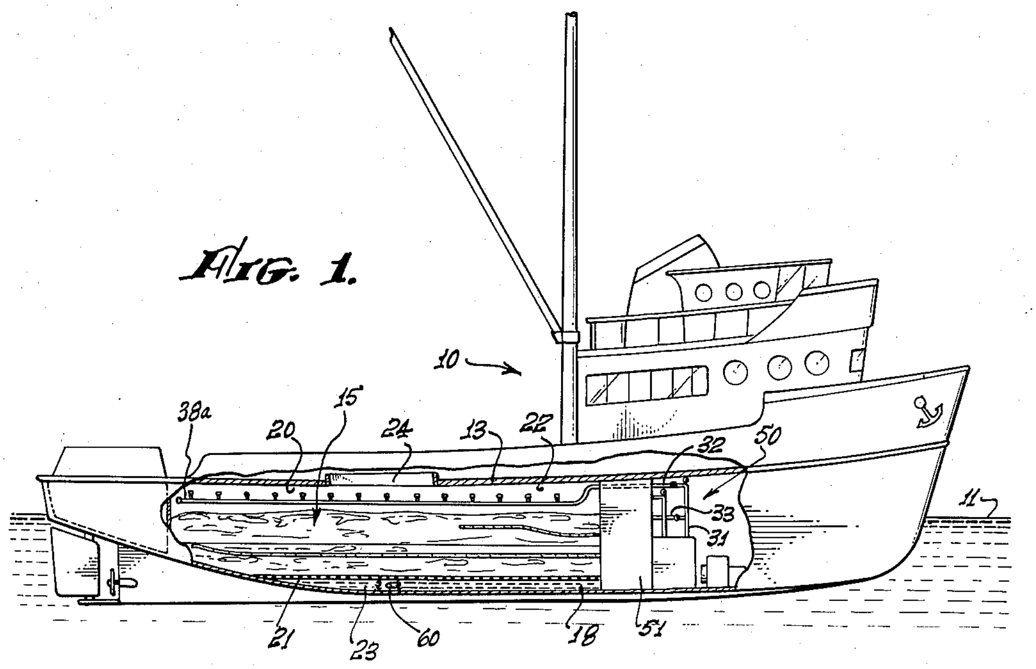
Figure 1 is an elevational view partially in section, of a fishing boat embodying the present invention.
Figure 3:
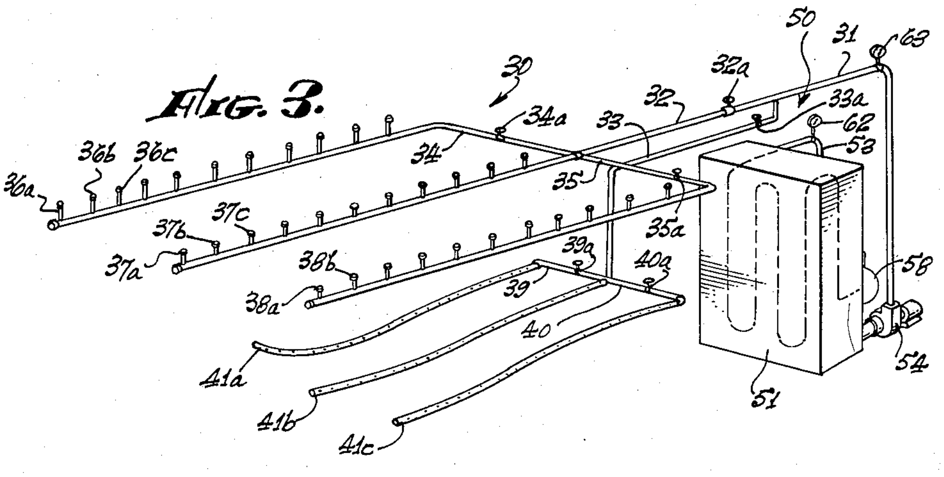
Figure 3 illustrates the spraying system utilized in the fishing boat of Figure 1.

Referring generally to Figures 1–4 of the drawings, a fishing boat 10 is illustrated as traveling in the ocean 11, with a freshly caught cargo of fish 15 being stored in fish hold 20 of the boat. A substantially horizontal grill structure 21 near the bottom of the fish hold divides the hold into an upper portion 22 and a lower portion 23. Liquid coolant 18 is continuously sprayed from a spraying system 30 onto the load of fish which has been stacked upon grill 21 in upper portion 22 of the hold 20. Liquid coolant drips through the stack of fish and collects in lower portion 23 of the hold, and is then pumped to a refrigerating system 50 where it is cooled and recirculated back into the spraying system.

Fish hold 20 is illustrated as having the sides thereof defined by the hull 12 of the vessel, and the top or ceiling thereof defined by the boat deck 13. A hatch 24 in deck 13 provides an opening through which the fish may be loaded or unloaded from the hold.

Spraying system 30 includes a liquid supply conduit 31 which feeds into a pair of conduits 32 and 33 controlled by manually operable valves **32*a* and 33*a*, respectively. Conduit 32 is connected to a pair of additional conduits 34 and 35 controlled by valves 34*a* and 35*a*, respectively, the three conduits 32, 34 and 35 being positioned substantially in a horizontal plane and running parallel to each other longitudinally of the fish hold 20 near the top of upper portion 22 thereof. Conduit 34 supplies liquid coolant to a plurality of spray nozzles 36*a*, 36*b*, etc.; conduit 32 supplies a string of spray nozzles 37*a*, 37*b*, 37*c*, etc.; and conduit 35 supplies a string of spray nozzles 38*a*, 38*b*, etc. All of the spray nozzles are adapted to spray the liquid coolant downwardly upon the load of fish stacked in hold 20**.

Conduit 33 of the spraying system supplies liquid coolant to conduits 39 and 40 controlled by valves **39*a* and 40*a*, respectively. Seeper hoses 41*a*, 41*b* and 41*c*, lying substantially in a horizontal plane and running parallel to each other longitudinally of the fish hold 20, receive liquid coolant from conduits 39, 33 and 40**, respectively.

As will be readily understood, the present invention is not limited to a fish hold of any particular size or shape, so long as a grill structure is provided therein for supporting the fish and for permitting the liquid coolant to drip through into the lower portion of the hold from whence it may be recovered and recirculated. While the seeper hoses as illustrated are useful in supplying liquid coolant to the interior portion of a large stack of fish, it will be understood that for a smaller cargo such seeper hoses would be unnecessary and the job could be accomplished by means of spray nozzles only. In any event, it is the purpose and intent of the present invention to continuously supply liquid coolant to the cargo of fish in a sprayed or dispersed form such that the air spaces within and surrounding the cargo of fish are continuously kept cold and humid, and that each individual fish of the cargo is continuously provided with a liquid coating covering a substantial portion of its exterior surface.

The reasons why the present invent:on provides many advantages hitherto unavailable may be summarized as follows. Continuous spraying of the liquid coolant insures continuous evaporation, and hence the cooling of all of the open spaces in the fish hold. The high humidity in the open spaces of the hold provides a much greater heat conductivity than could be obtained from a dry air space and hence establishes a uniform temperature and rapid cooling action. High humidity of the air spaces is also advantageous in that it prevents dehydration of the fish such as occurs, for example, in the ice-pack method of storage.

When freshly caught fish are first stored in the hold it is necessary that the heat be removed from them with sufficient rapidity to forestall spoilage. A continuous flow of liquid coolant which comes in contact with a substantial portion of the surface of each fish provides as much cooling capacity as could be obtained by any previously known method. This is so because the carrying away of the heat from the fish is not dependent upon the flow of heat through a body of liquid, as in the cold brine method of storage, but rather is accomplished by the flow of the liquid itself which occurs in a continuous and rapid manner in response to the ever-present force of gravity. Thus, during the initial cooling of the fish after the catch has been stored in the hold, the rate at which the cooling takes place can be established at any desired value simply by recirculating liquid coolant at a sufficiently rapid rate and providing a refrigerating system of sufficient capacity for cooling the liquid coolant as it is recirculated.

In carrying out the present invention it is convenient to utilize as the liquid coolant a brine solution which consists of ocean water as taken directly from the ocean or in a modified form. The undesirable effects of salt penetration into the fish cargo which occurs in the cold brine method of storage are substantially eliminated by the present invention. In the cold brine method of storage, the occurrence of salt penetration into the fish is largely a result of the fluid pressure of the brine in the fish tank. According to the present invention the fish are not immersed in the liquid coolant bath, hence the fluid pressure at the exterior surface of each fish is limited to the atmospheric pressure.

Continuing now with the decription of the apparatus as illustrated in the drawings, a return conduit 60 positioned in lower portion 23 of the fish hold 20 is connected to a collector pump 52 which collects the relatively warm liquid coolant and pumps it through a conduit 53 into the upper portion of a cooling tank 51. A plurality of cooling pipes 57 positioned within cooling tank 51 are coupled to a refrigerator compressor 58 which circulates a refrigerant through the cooling pipes. After the liquid coolant has been cooled by passing through tank 51, it is drawn through a conduit 59 by a pump 54 and is continuously supplied to the spraying system 30 via conduit 31.

Conduit 53 empties the warm or used liquid coolant into the upper extremity of tank 51, where it falls on the upper surface of a filtering screen 55. Screen 55 is inclined at an angle with its upper end adjacent inlet conduit 53, so that the liquid coolant runs down the surface of the screen while simultaneously filtering through. Means, not shown, are preferably provided for periodically cleaning the filter screen. In this manner accumulations of blood and other organic material may be removed from the cooling system. Not only are the fish protected against spoilage, therefore, but the cargo when delivered to port is in a clean and wholesome condition.

A temperature gauge 62 is mounted on conduit 53 thus permitting continuous observation of the temperature of the relatively warm liquid coolant as it is pumped from the hold. Another temperature gauge 63 on conduit 31 provides a continuous indication of the temperature of the refrigerated coolant being supplied to the spraying system. Operation of the system can then be controlled by varying the rate at which the liquid coolant is recirculated, or by controlling the refrigerator compressor to increase or decrease its effective output, or both.

In Figure 6 of the drawings there is illustrated a portion of a seeper hose 42 which may be satisfactorily used in carrying out the present invention. Hose 42 has a number of openings **42*a*, 42*b***, etc. spaced throughout its length for dispensing the liquid coolant therethrough.

Figure 5:
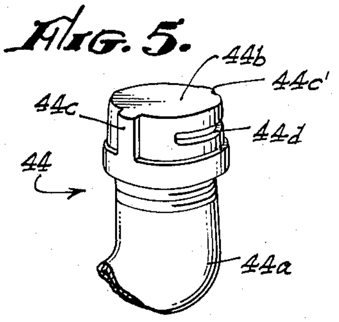
Figure 5 illustrates one form of spray nozzle.

In Figure 5 is illustrated a spray nozzle 44 which may be utilized in carrying out the present invention. Mounted upon the upwardly disposed threaded end of a conduit **44*a*, nozzle 44 includes an inverted cup 44*b* having internal threads (not shown) and having exterior flanges 44*c*, 44*c'* which may be grasped for loosening it or tightening the nozzle upon the conduit. A horizontal slot 44*d* extending partially around the cup 44*b*** provides an opening through which the liquid coolant emerges in a spray or other dispersed configuration.

In Figure 7 there is illustrated another form of spray nozzle which may be utilized in the present invention. Thus, the nozzle 43 includes a fixture **43*a* engaging the threaded upwardly disposed end of a conduit 43*b* for projecting a stream of the liquid coolant vertically upwardly where it strikes the under surface of a deflection housing 43c. Deflection housing 43c is in the form of a hollow cone whose vertex defines an obtuse angle. Deflection housing 43c is rigidly supported by ribs 43d, 43d', each of which interconnects a point on the lower rim of the deflection housing with member 43a**.

Although the form of my invention above described in detail is fully capable of achieving the results and providing the advantages hereinbefore mentioned, it is to be understood that it is merely the presently preferred embodiment thereof, and that I do not mean to be limited to the details of construction above described other than as defined in the appended claims.

I claim:

1. Apparatus for cooling and storing freshly caught fish in the hold of a ship, comprising: substantially horizontally extending grill means disposed in the lower portion of said hold, the space in said hold above said grill means defining a fish-receiving chamber and the space below said grill means defining a liquid refrigerant-receiving chamber; a body of liquid refrigerant having a volume equal to or less than the volume of said liquid refrigerant-receiving chamber; conduit means for said liquid refrigerant extending through said fish-receiving chamber; spray nozzles on said conduit means that direct said liquid refrigerant onto fish disposed within said fish receiving chamber; a refrigerating system on said ship that receives said liquid refrigerant and reduces the heat content thereof to a value required for preventing spoilage of said fish; pumping means that force said liquid refrigerant from said liquid refrigerant-receiving chamber through said refrigerating system and said spraying means; and a plurality of apertured flexible conduits extending through said fish-receiving chamber below said first-mentioned conduit means that supply said liquid refrigerant into spaces defined between fish arranged within said fish-receiving chamber.

2. Apparatus for cooling and storing freshly caught fish in the hold of a ship, comprising: substantially horizontally extending grill means disposed in the lower portion of said hold, the space in said hold above said grill means defining a fish-receiving chamber and the space below said grill means defining a liquid refrigerant-receiving chamber; a body of liquid refrigerant having a volume equal to or less than the volume of said liquid refrigerant-receiving chamber; conduit means for said liquid refrigerant extending through said fish receiving chamber; spray nozzles on said conduit means that direct said liquid refrigerant onto fish disposed within said fish-receiving chamber; a refrigerating system on said ship that receives said liquid refrigerant and reduces the heat content thereof to a value required for preventing spoilage of said fish; pumping means that force said liquid refrigerant from said liquid refrigerant-receiving chamber through said refrigerating system and said spraying means; a plurality of apertured flexible conduits extend-through said fish-receiving chamber below said first-mentioned conduit means that supply said liquid refrigerant into spaces defined between fish arranged within said fish-receiving chamber; and filtering means disposed in the path of said liquid refrigerant to remove organic material from said liquid refrigerant.

3. Apparatus for cooling and storing freshly caught fish in the hold of a ship, comprising: substantially horizontally extending apertured fish-supporting means disposed in the lower portion of said hold, the space in said hold above said fish-supporting means defining a fish-receiving chamber and the space below said fish-supporting means defining a liquid refrigerant-receiving chamber; a body of liquid refrigerant having a volume equal to or less than the volume of said liquid refrigerant-receiving chamber; main spraying means within said hold that direct said liquid refrigerant over the upper portion of fish arranged within said fish-receiving chamber; auxiliary spraying means within said hold that direct said liquid refrigerant through the spaces separating the individual fish arranged within said fish-receiving chamber, said auxiliary spraying means being disposed below said main spraying means and extending between the spaces separating said individual fish; a refrigerating system on said ship that receives said liquid refrigerant and reduces the heat content thereof to a value required for preventing spoilage of said fish; and pumping means that force said liquid refrigerant from said liquid refrigerant-receiving chamber through said refrigerating system and said main and auxiliary sprayng means.

4. Apparatus for cooling and storing freshly caught fish in the hold of a ship, comprising: substantially horizontally extending apertured fish-supporting means disposed in the lower portion of said hold, the space in said hold above said fish-supporting means defining a fish-receiving chamber and the space below said fish-supporting means defining a liquid refrigerant-receiving chamber; a body of liquid refrigerant having a volume equal to or less than the volume of said liquid refrigerant-receiving chamber; main spraying means within said hold that direct said liquid refrigerant over the upper portion of fish arranged within said fish-receiving chamber; auxiliary spraying means within said hold that direct said liquid refrigerant through the spaces separating the individual fish arranged within said fish-receiving chamber, said auxiliary spraying means being disposed below said main spraying means means and extending between the spaces separating said individual fish; a refrigerating system on said ship that receives said liquid refrigerant and reduces the heat content thereof to a value required for preventing spoilage of said fish; pumping means that force said liquid refrigerant from said liquid refrigerant-receiving chamber through said refrigerating system and said main and auxiliary spraying means; and filtering means disposed in the path of said liquid refrigerant to remove organic material from said liquid refrigerant.

5. Apparatus for cooling and storing freshly caught fish in the hold of a ship, comprising: fish-supporting means disposed in the lower portion of said hold, the space in said hold above said fish-supporting means defining a fish-receiving chamber; a body of liquid refrigerant having a volume equal to or less than the volume of said hold; main spraying means within said hold that direct said liquid refrigerant over the upper surfaces of a body of fish arranged within said hold; auxilairy spraying means within said hold below said main spraying means, said auxiliary spraying means directing said liquid refrigerant through the spaces between the fish arranged within said hold; a refrigerating system on said ship that receives said liquid refrigerant and reduces the heat content thereof to a value required for preventing spoilage of said fish; conduit means connecting the lower portion of said hold with said refrigerating system; and pumping means in communication with said conduit means that force said liquid refrigerant from said hold through said refrigerating system and through said main and auxiliary spraying means.

6. Apparatus for cooling and storing freshly caught fish in the hold of a ship, comprising: fish-supporting means disposed in the lower portion of said hold, the space in said hold above said fish-supporting means defining a fish-receiving chamber; a body of liquid refrigerant having a volume equal to or less than the volume of said hold; main spraying means within said hold that direct said liquid refrigerant over the upper surfaces of a body of fish arranged within said hold; auxiliary spraying means within said hold below said main spraying means, said auxiliary spraying means directing said liquid refrigerant through the spaces between the fish arranged within said hold; a refrigerating system on said ship that receives said liquid refrigerant and reduces the heat content thereof to a value required for preventing spoilage of said fish; conduit means connecting the lower portion of said hold with said refrigerating system; pumping means in communication with said conduit means that force said liquid refrigerant from said hold through said refrigerating system and through said main and auxiliary spraying means; and filtering means disposed in the path of said liquid refrigerant to remove organic material from said liquid refrigerant.

7. A method of cooling and storing freshly caught fish in the hold of a ship by means of a plurality of liquid refrigerant dispensing means that includes: arranging a first layer of said fish in a fish-receiving chamber of said hold; disposing a portion of said liquid refrigerant dispensing means in physical contact with said first layer of fish; spraying liquid refrigerant over said first layer of fish by means of said portion of said liquid refrigerant dispensing means; arranging a second layer of fish in said fish-receiving chamber above said first layer of fish;

spraying refrigerant over the upper surfaces of said second layer of fish by means of the remainder of said liquid refrigerant dispensing means whereby refrigerant from said liquid refrigerant dispensing means will pass continuously downwardly over said fish into a refrigerant receiving-zone disposed below said fish-receiving zone; and returning said refrigerant to said refrigerating zone for subsequent spraying over said fish in a continuous recirculating cycle.

References Cited in the file of this patent

UNITED STATES PATENTS

| | | |
|---|---|---|
| 1,894,813 | Zarotschenzeff | Jan. 17, 1933 |
| 1,947,327 | Brettell | Feb. 13, 1934 |
| 2,746,272 | Carpenter | May 22, 1956 |